United States Patent
Cassady et al.

(10) Patent No.: US 11,828,926 B2
(45) Date of Patent: Nov. 28, 2023

(54) SHAPED REFLECTOR FOR COAXIAL ILLUMINATION OF NON-NORMAL SURFACES

(71) Applicant: VIAVI Solutions Inc., San Jose, CA (US)

(72) Inventors: Kevin Cassady, Monroe, WA (US); Jay Brace, Seattle, WA (US)

(73) Assignee: VIAVI Solutions Inc., Chandler, AZ (US)

(*) Notice: Subject to any disclaimer, the term of this patent is extended or adjusted under 35 U.S.C. 154(b) by 131 days.

(21) Appl. No.: 17/249,786

(22) Filed: Mar. 12, 2021

(65) Prior Publication Data

US 2022/0291497 A1 Sep. 15, 2022

(51) Int. Cl.
G02B 21/36 (2006.01)
G02B 6/38 (2006.01)
G02B 21/06 (2006.01)

(52) U.S. Cl.
CPC ........... *G02B 21/361* (2013.01); *G02B 6/381* (2013.01); *G02B 21/06* (2013.01)

(58) Field of Classification Search
CPC ...... G02B 21/361; G02B 6/381; G02B 21/06; G02B 21/16; G02B 21/18; G02B 21/362; G02B 21/3833; G02B 6/384; G02B 21/385; G02B 6/385; G02B 21/0008; G01M 11/0278; G01M 11/081; G01M 11/088; G01M 11/3154

USPC .......................................................... 359/385
See application file for complete search history.

(56) References Cited

U.S. PATENT DOCUMENTS

| | | | |
|---|---|---|---|
| 4,601,551 A | 7/1986 | Pettingell et al. | |
| 9,841,567 B1* | 12/2017 | Zhou | G02B 7/1825 |
| 2008/0177183 A1* | 7/2008 | Courtney | A61B 8/5238 |
| | | | 600/463 |
| 2014/0005555 A1* | 1/2014 | Tesar | A61B 50/13 |
| | | | 600/476 |
| 2016/0291257 A1* | 10/2016 | Huang | G02B 21/0004 |
| 2018/0024341 A1* | 1/2018 | Romanowski | G02B 21/16 |
| | | | 359/385 |
| 2021/0270695 A1* | 9/2021 | Diepstraten | G01M 11/088 |

* cited by examiner

Primary Examiner — Balram T Parbadia
Assistant Examiner — Rahman Abdur
(74) Attorney, Agent, or Firm — Harrity & Harrity, LLP (57) ABSTRACT

A microscope may receive a fiber optic connector via a connector adapter of the microscope, wherein the connector adapter includes an opening and a shaped reflective surface surrounding the opening. The microscope may align a ferrule of the fiber optic connector with the opening of the connector adapter of the microscope, wherein the ferrule includes a ferrule chamfer or a ferrule radius. The microscope may transmit direct light onto the shaped reflective surface and may receive reflected light from the ferrule chamfer or the ferrule radius and with a camera of the microscope.

20 Claims, 9 Drawing Sheets

SHAPED REFLECTOR FOR COAXIAL ILLUMINATION OF NON-NORMAL SURFACES

BACKGROUND

A microscope, such as a video microscope, may be used to view a fiber optic connector and to determine imperfections and contamination on the endface of the fiber optic connector.

SUMMARY

In some implementations, a method may include receiving a fiber optic connector via a connector adapter of a microscope, wherein the connector adapter includes an opening and a shaped reflective surface surrounding the opening. The method may include aligning a ferrule of the fiber optic connector with the opening of the connector adapter of the microscope, wherein the ferrule includes a ferrule chamfer or a ferrule radius. The method may include transmitting direct light onto the shaped reflective surface and receiving reflected light from the ferrule chamfer or the ferrule radius and with a camera of the microscope.

In some implementations, a microscope may include a connector adapter that includes an opening and a shaped reflective surface surrounding the opening. The connector adapter may be configured to align a ferrule of a fiber optic connector with the opening of the connector adapter, and the ferrule may include a ferrule chamfer. The microscope may include a light source to transmit direct light to the shaped reflective surface and onto the ferrule chamfer, and a camera to receive reflected light from the ferrule chamfer.

In some implementations, a connector adapter may include a body portion configured to connect with an optical microscope. The body portion may include an opening that is configured to receive and retain a ferrule of a fiber optic connector and the ferrule may include a ferrule chamfer. The connector adapter may include a shaped reflective surface surrounding the opening and being configured to receive direct light from a light source of the optical microscope, and reflect the direct light, as reflected light, to a camera of the optical microscope and via the ferrule chamfer.

DETAILED DESCRIPTION

The following detailed description of example implementations refers to the accompanying drawings. The same reference numbers in different drawings may identify the same or similar elements.

A fiber optic connector may include a connector body that retains a cylindrical ceramic ferrule. The ferrule includes a small bore through a central axis that supports a piece of optical fiber. A flexible jacket may house the optical fiber that exits the fiber optic connector. The optical fiber is fixed in place in the bore, and the optical fiber and an endface of the ferrule are polished to a smooth finish. Typically, a chamfer or a bevel is added at a circular edge formed between the end face and a cylindrical face of the ferrule. The chamfer protects the edge from damage and facilitates insertion into mating adapters.

A microscope may use coaxial illumination to illuminate surfaces of the ferrule. Light emitted from a light source of the microscope reflects from a beam splitter (e.g., half of the light reflects, and half of the light passes through). The light reflected from the beam splitter passes through a lens of the microscope and reflects from the ferrule endface and the optical fiber. The reflected light passes back through the lens and forms an image of the ferrule endface at a camera of the microscope. Such a technique is referred to as bright field illumination.

However, some light is not reflected directly back through the lens (e.g., light that reflects from the ferrule chamfer) and does not form an image at the camera. Some light scatters after striking a surface. For example, if the ferrule chamfer is not polished smooth, there is significant light scattering caused by the ferrule chamfer. Scattered light with a great enough intensity reenters the lens and forms an image at the camera. Such an image has different characteristics and is generally referred to as oblique illumination, dark field illumination, or stray light illumination. The image formed by oblique illumination is qualitatively different from bright field illumination. Most inspections of fiber optic endfaces rely on bright field illumination and may be inaccurate when using only oblique illumination. Thus, current inspection techniques waste computing resources (e.g., processing resources, memory resources, communication resources, and/or the like), networking resources, human resources, and/or the like associated with performing incorrect inspections of fiber optic connectors, incorrectly determining that faulty fiber optic connectors are functional, implementing faulty fiber optic connectors in networks, losing network data because of the faulty fiber optic connectors, and/or the like.

Some implementations described herein relate to a microscope that utilizes a shaped reflector for coaxial illumination of non-normal surfaces. For example, the microscope may receive a fiber optic connector via a connector adapter of the microscope, wherein the connector adapter includes an opening and a shaped reflective surface surrounding the opening. The microscope may align a ferrule of the fiber optic connector with the opening of the connector adapter of the microscope, wherein the ferrule includes a ferrule chamfer. The microscope may transmit direct light onto the shaped reflective surface and may receive reflected light from the ferrule chamfer and with a camera of the microscope.

In this way, the microscope utilizes a shaped reflector for coaxial illumination of non-normal surfaces. The microscope may include a reflector with a geometry that allows illumination from the light source to image the ferrule chamfer with bright field illumination. The light from the light source is reflected by the reflector in such a way that subsequent light reflected from the ferrule chamfer passes back through the lens. The ferrule chamfer and the reflector may be conical and axially symmetric. This, in turn, conserves computing resources, networking resources, human resources, and/or the like that would otherwise have been wasted in performing incorrect inspections of fiber optic connectors, incorrectly determining that faulty fiber optic connectors are functional, implementing faulty fiber optic connectors in networks, losing network data because of the faulty fiber optic connectors, and/or the like.

FIGS. 1A-1G are diagrams of an example 100 associated with utilizing a shaped reflector for coaxial illumination of non-normal surfaces. As shown in FIGS. 1A-1G, example 100 includes a microscope 105 and a fiber optic connector 110. Microscope 105 may be an optical microscope or video microscope with or without a display, used to view fiber optic connector 110 and to determine imperfections in fiber optic connector 110, and/or the like. Fiber optic connector 110 may include any fiber optic connector that includes an optical fiber, such as a fiber-optic connector (FC), an FC/physical content (PC) connector, an FC/angled physical content (APC) connector, a snap-in connector (SC), an ST connector, a small-form factor (LC) connector, and/or the like. Further details of microscope 105 and fiber optic connector 110 are provided elsewhere herein.

Figure 1A:
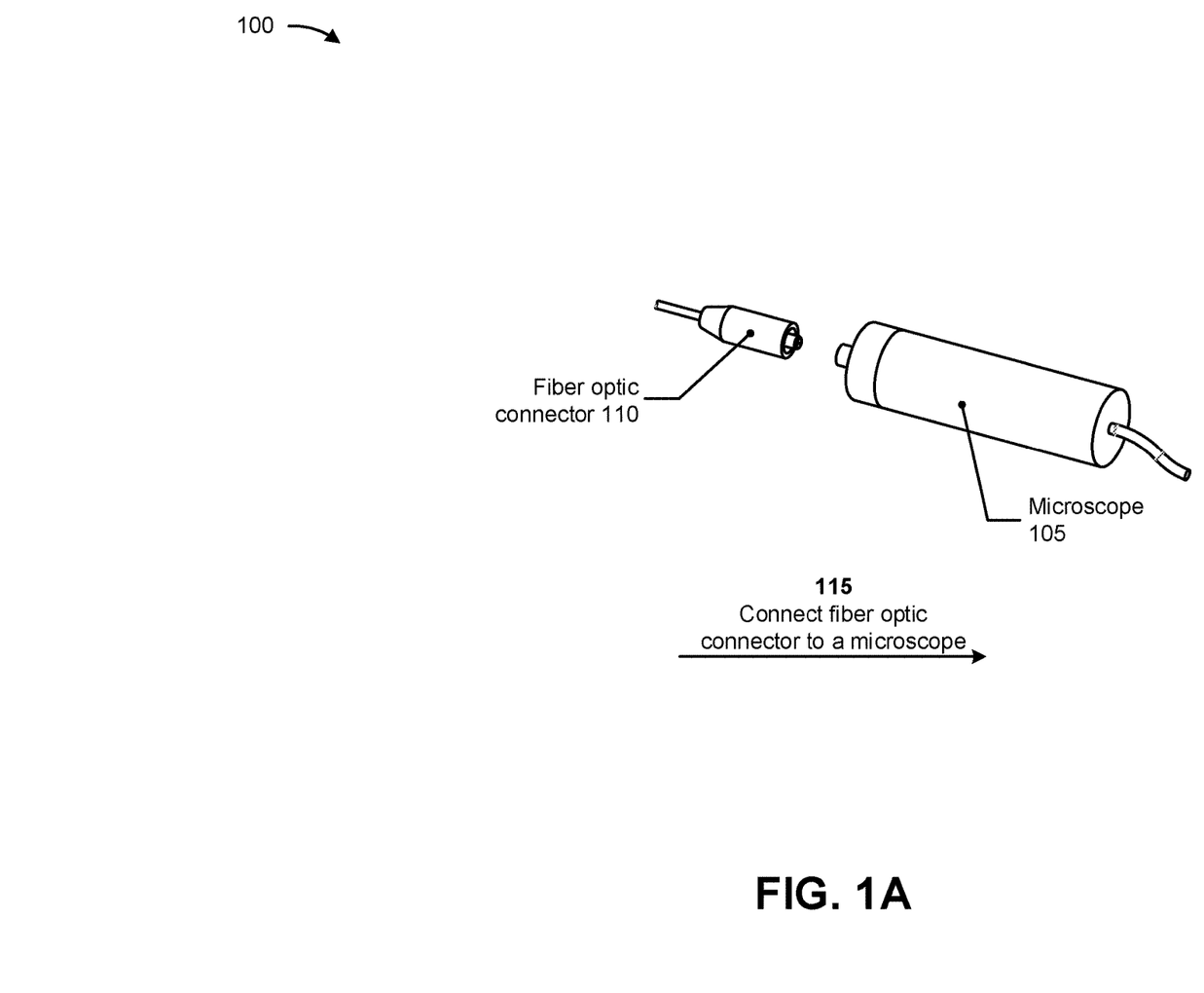
FIGS. 1A-1G are diagrams of an example implementation described herein.

As shown in FIG. 1A, and by reference number 115, fiber optic connector 110 may be connected to microscope 105. For example, fiber optic connector 110 may be inserted into microscope 105 so that fiber optic connector 110 may be retained in and tested by microscope 105. Further details of the interconnection of fiber optic connector 110 and microscope 105 are provided elsewhere herein.

Figure 1B:
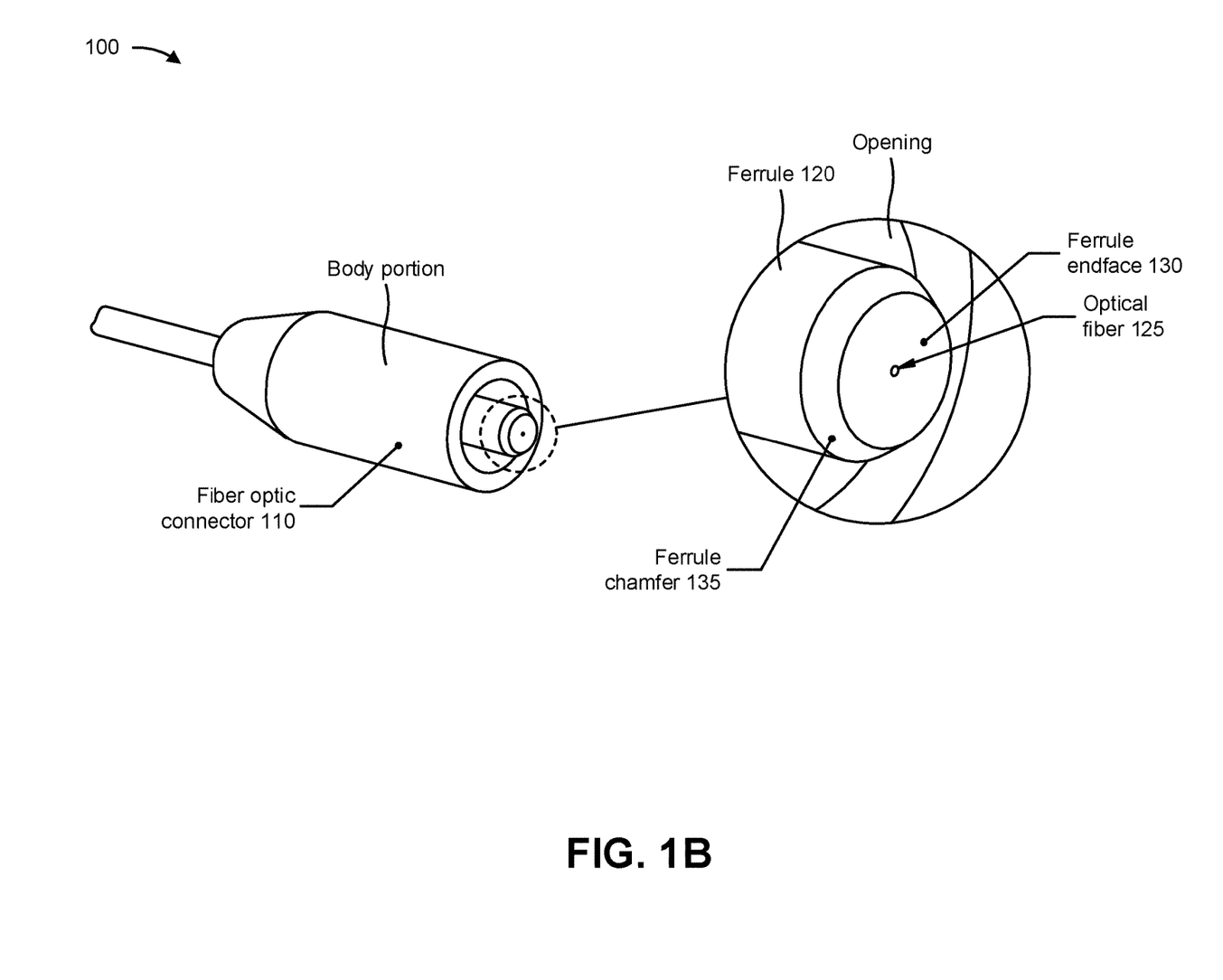

As shown in FIG. 1B, fiber optic connector 110 may include a ferrule 120 that extends through a body portion of fiber optic connector 110 and outward away from an opening of the body portion. Ferrule 120 may be cylindrical, square, rectangular, and/or the like in shape and may be made from a variety of materials, such as plastic, stainless steel, ceramic, and/or the like. Ferrule 120 may be sized and shaped based on an application of fiber optic connector 110 (e.g., based on a size and shape associated with a mating fiber optic adapter). Ferrule 120 may include a bore through a central axis that includes an optical fiber 125. Optical fiber 125 may be fixed in place in the bore. Ferrule 120 may include a ferrule endface 130. Optical fiber 125 and ferrule endface 130 may be polished to a smooth finish. Ferrule 120 may include a ferrule chamfer 135 or a bevel provided at an edge formed between ferrule endface 130 and an outer surface of the body portion of ferrule 120. Ferrule chamfer 135 may protect the edge from damage and may facilitate insertion into mating fiber optic adapters. In some implementations, ferrule chamfer 135 may be replaced with a ferrule radius provided at the edge formed between ferrule endface 130 and the outer surface of the body portion of ferrule 120.

Figure 1C:
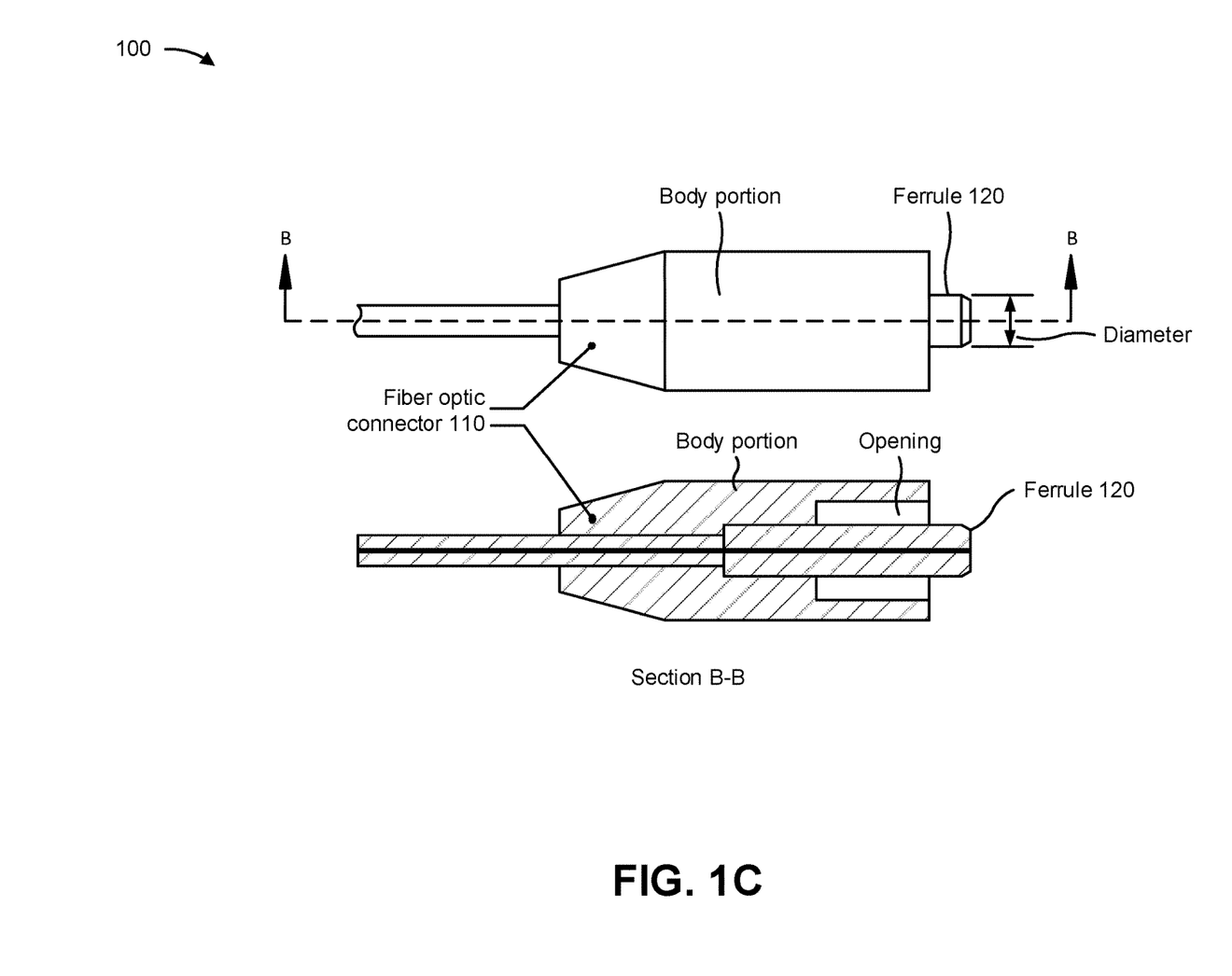

A side view of fiber optic connector 110 is shown in the top part of FIG. 1C and a sectional view of fiber optic connector 110, taken along line B-B of the side view, is shown in the bottom part of FIG. 1C provides. As shown in the side view, ferrule 120 may include a diameter that is based on an application of fiber optic connector 110. For example, diameter may range from approximately one millimeter (1 mm) to approximately three millimeters (3 mm). As shown in the sectional view, ferrule 120 may extend from within the body portion of fiber optic connector 110, through the opening of fiber optic connector 110, and away from the body portion and the opening.

Figure 1D:
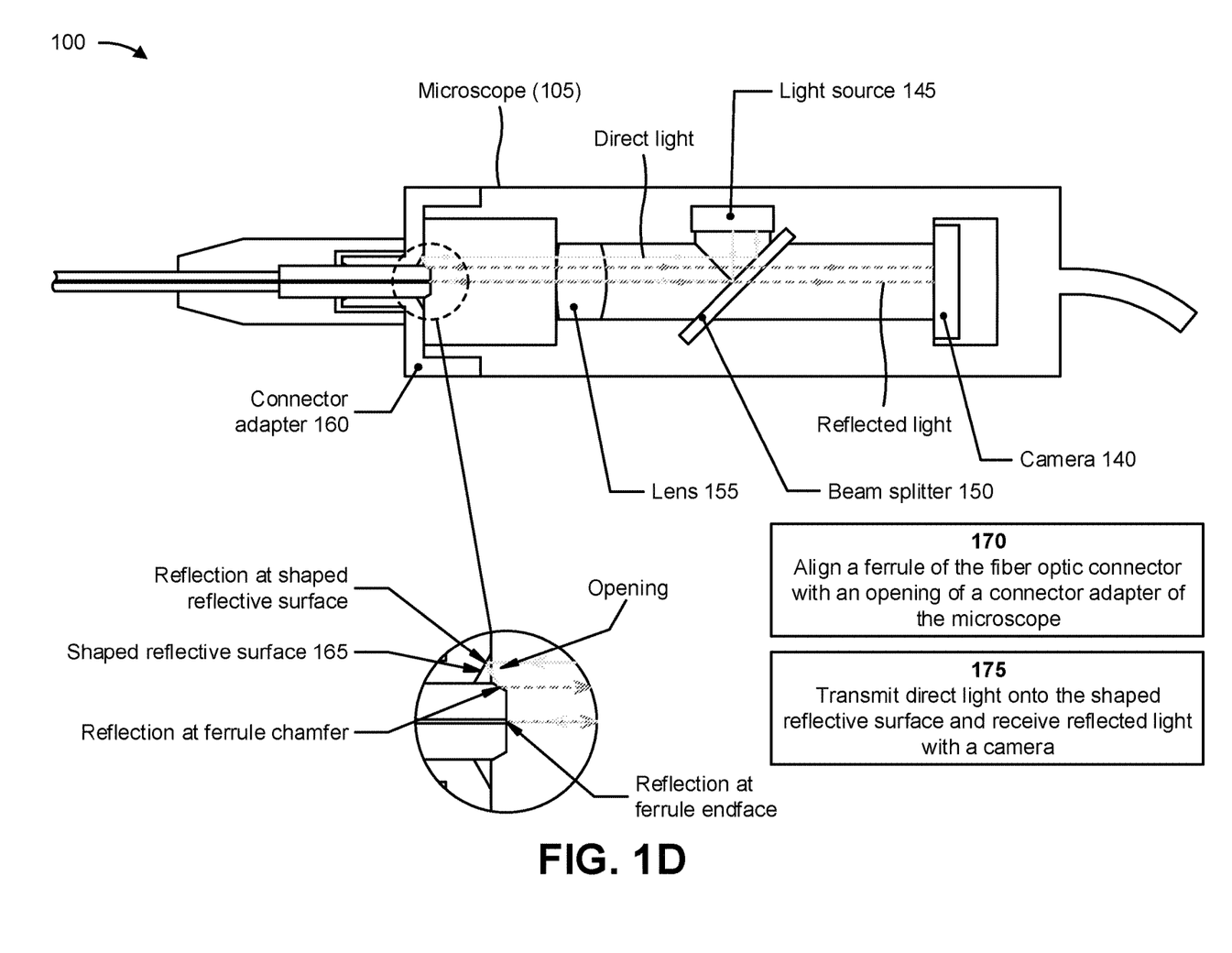

As shown in FIG. 1D, microscope 105 may include a camera 140, a light source 145, a beam splitter 150, a lens 155, and a connector adapter 160. Camera 140 may include an image sensor that captures images provided by light reflected from ferrule endface 130. For example, camera 140 may include a complementary metal-oxide-semiconductor (CMOS) megapixel image sensor. Light source 145 may include a light-emitting diode (LED) light source, an incandescent light source, a fluorescent light source, a halogen light source, and/or the like that generates direct light. Beam splitter 150 may include an optical device that splits a beam of light in two. For example, beam splitter 150 may include two triangular glass prisms that are joined together to form a cube, such that half of light incident on one face of the cube is reflected and another half of the light is transmitted due to frustrated total internal reflection.

In operation, microscope 105 may utilize coaxial illumination to illuminate surfaces of ferrule 120. Half of light emitted from light source 145 of microscope 105 reflects from beam splitter 150 toward lens 155. The light reflected from beam splitter 150 passes through lens 155 of microscope 105 and reflects from ferrule endface 130 and optical fiber 125 as reflected light. The reflected light passes back through lens 155 and lens 155 forms an image of optical fiber 125 and ferrule endface 130 at camera 140.

Connector adapter 160 may be sized and shaped to fit within and connect to an end portion of microscope 105 (e.g., an end portion that is opposite of an end portion associated with camera 140). Connector adapter 160 may be formed from a variety of materials (e.g., metal, plastic, glass, and/or the like), and may include an opening that is sized and shaped to receive and retain ferrule 120 of fiber optic connector 110. In some implementations, the opening of connector adapter 160 is axially aligned with an axis of ferrule 120 (e.g., the bore provided through ferrule 120 and including optical fiber 125).

As further shown in FIG. 1D, connector adapter 160 may include a shaped reflective surface 165 provided around the opening of connector adapter 160. A size and a shape of shaped reflective surface 165 may depend on a size and a shape of ferrule 120 and on a size and a shape of ferrule chamfer 135. Shaped reflective surface 165 may be formed from a variety of materials, such as a polished metal, a coated glass, a metallized plastic, and/or the like.

As further shown in FIG. 1D, and by reference number 170, ferrule 120 of fiber optic connector 110 may be aligned with and retained in the opening of connector adapter 160 of microscope 105. As shown by reference number 175, the direct light from light source 145 may be transmitted onto shaped reflective surface 165 (e.g., via beam splitter 150 and lens 155) and may be received as reflected light with camera 140. For example, and as shown in the magnified view of FIG. 1D, some of the direct light may be transmitted to shaped reflective surface 165 and reflected by shaped reflective surface 165 to ferrule chamfer 135. Ferrule chamfer 135 may reflect the direct light as reflected light. The reflected light from ferrule chamfer 135 may travel through lens 155 and beam splitter 150 and may be received by camera 140. Some of the direct light may be transmitted to ferrule endface 130 and reflected by ferrule endface 130 as reflected light. The reflected light from ferrule endface 130 may travel through lens 155 and beam splitter 150 and may be received by camera 140.

Figure 1E:
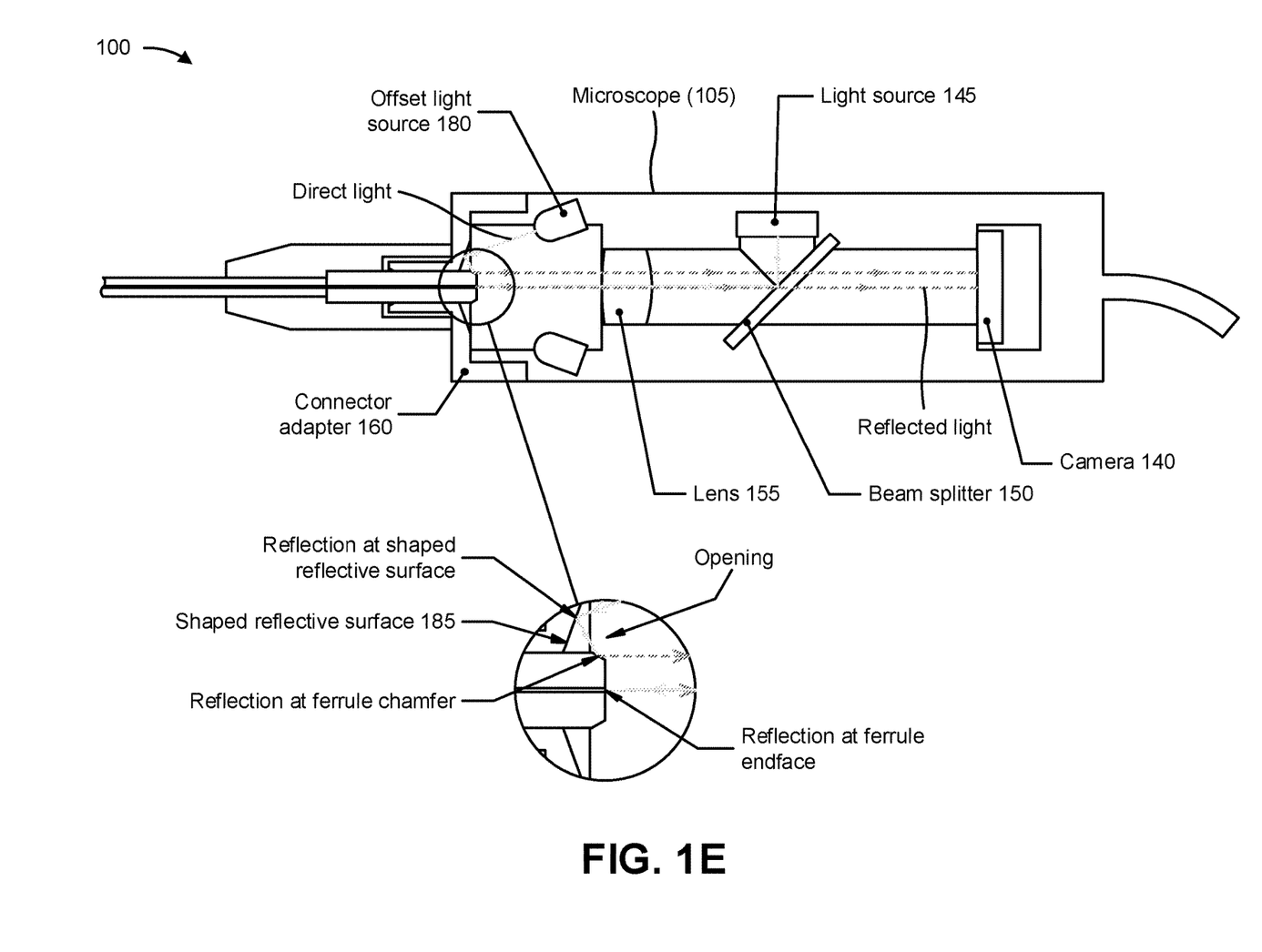

As shown in FIG. 1E, in some implementations, microscope 105 includes light source 145, an offset light source 180, and a shaped reflective surface 185. Offset light source 180 may include an LED light source, an incandescent light source, a fluorescent light source, a halogen light source, and/or the like that generates direct light. Offset light source 180 may generate the direct light at an angle rather than coaxially with camera 140, beam splitter 150, and/or lens 155. Shaped reflective surface 185 may include the features of shaped reflective surface 165 described above in connection with FIG. 1D. However, since the direct light from offset light source 180 is provided at an angle, shaped reflective surface 185 may include a different geometry than shaped reflective surface 165. For example, the geometry of shaped reflective surface 185 may be adapted to the angle of the direct light received from offset light source 180 in such a way that the reflected light forms a bright field image at camera 140.

As shown in the magnified view of FIG. 1E, the direct light from offset light source 180 may be transmitted to shaped reflective surface 185 and reflected by shaped reflective surface 185 to ferrule chamfer 135. Ferrule chamfer 135 may reflect the direct light as reflected light. The reflected light from ferrule chamfer 135 may travel through lens 155 and beam splitter 150 and may be received by camera 140. The direct light from light source 145 may be transmitted to ferrule endface 130 and reflected by ferrule endface 130 as reflected light. The reflected light from ferrule endface 130 may travel through lens 155 and beam splitter 150 and may be received by camera 140.

Figure 1F:
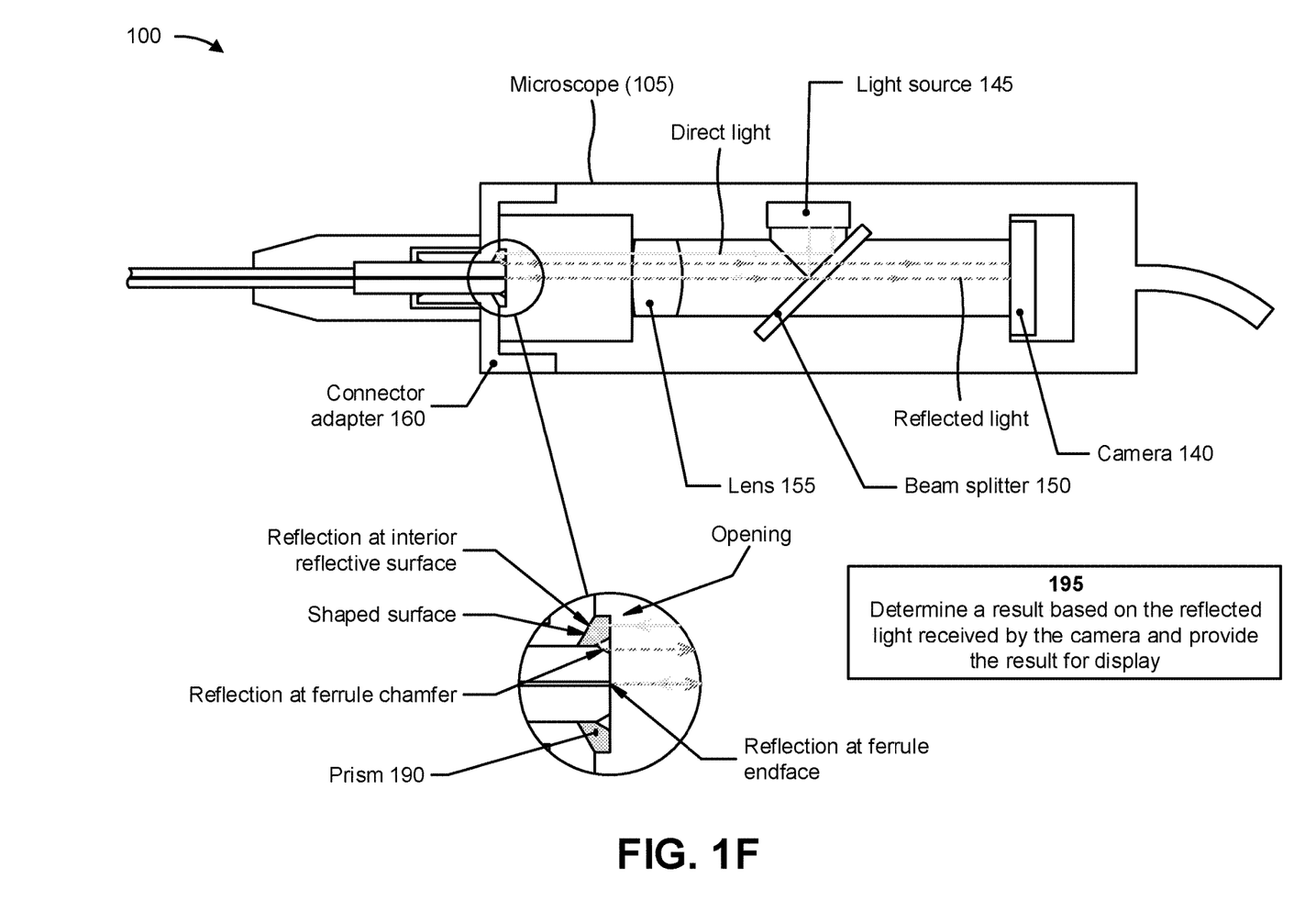

As shown in FIG. 1F, in some implementations, microscope 105 includes a prism 190 provided around the opening of connector adapter 160 and including to a shaped surface that is shaped in a manner similar to shaped reflective surface 165. The shaped surface of prism 190 may be an interior reflective surface that reflects direct light in a manner similar to shaped reflective surface 165. Prism 190 may be sized and shaped to connect to the opening of connector adapter 160 and may be formed from a variety of materials, such as glass, plastic, fluorite, and/or the like. A portion of prism 190 may be transparent, to receive the direct light and provide the direct light to the interior reflective surface of prism 190. The interior reflective surface of prism 190 may be reflective, to reflect the direct light in a manner similar to shaped reflective surface 165. The interior reflection with prism 190 may be provided by a reflective surface coating provided on the interior reflective surface or as a result of total internal reflection.

As shown in the magnified view of FIG. 1F, some of the direct light from light source 145 may be transmitted through prism 190 to the interior reflective surface of prism 190 and may be reflected by the interior reflective surface to ferrule chamfer 135. Ferrule chamfer 135 may reflect the direct light as reflected light. The reflected light from ferrule chamfer 135 may travel through lens 155 and beam splitter 150 and may be received by camera 140. Some of the direct light from light source 145 may be transmitted to ferrule endface 130 and reflected by ferrule endface 130 as reflected light. The reflected light from ferrule endface 130 may travel through lens 155 and beam splitter 150 and may be received by camera 140.

As further shown in FIG. 1F, and by reference number 195, microscope 105 may determine a result based on the reflected light received by camera 140 and provide the result for display. For example, microscope 105 may determine an inspection result (e.g., a fault, no issues, and/or the like) for fiber optic connector 110 based on the reflected light received by camera 140. Microscope 105 may provide the result for display on a display device associated with microscope 105.

Figure 1G:
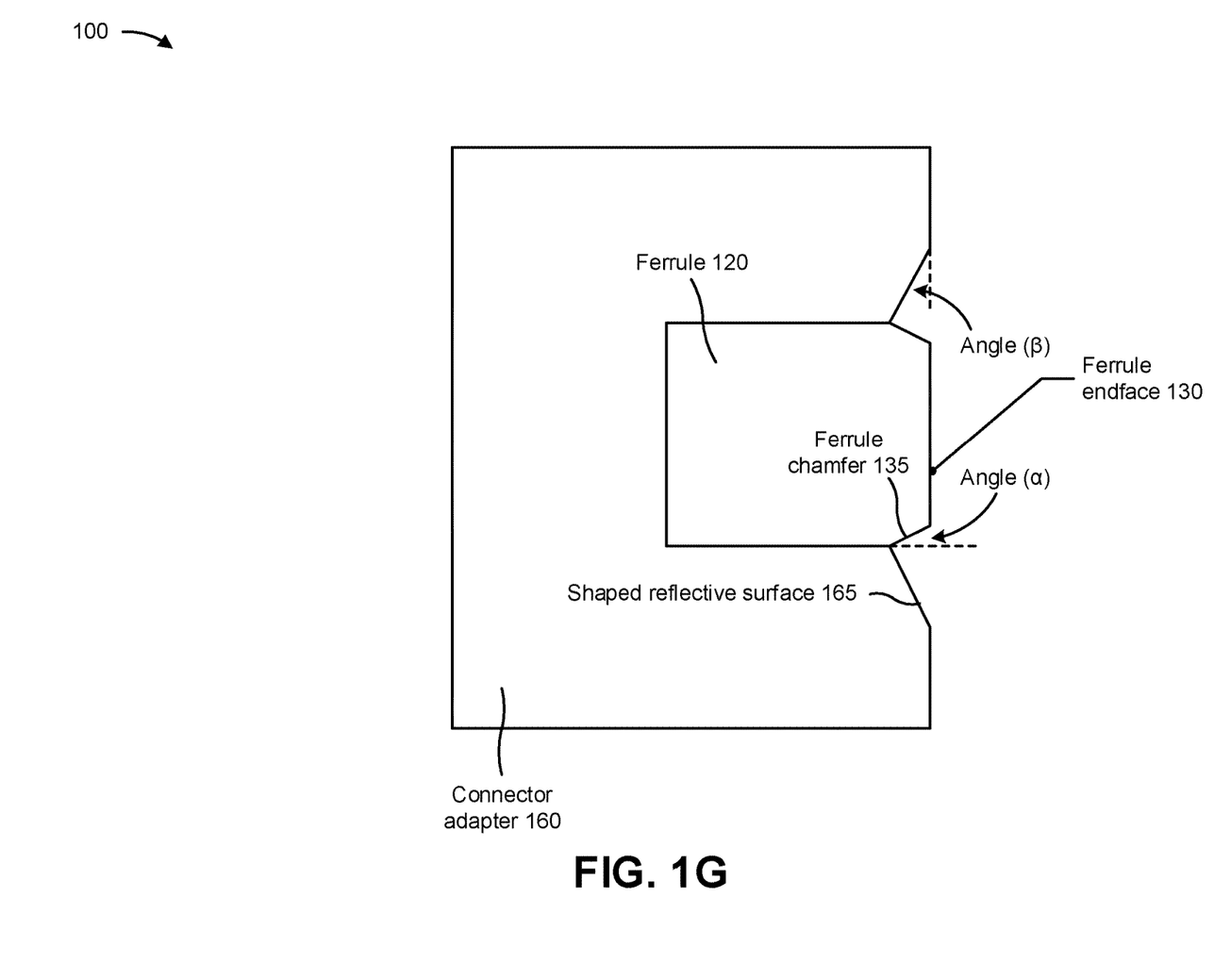

As shown in FIG. 1G, ferrule chamfer 135 of ferrule 120 may be provided at an angle $\alpha$ relative to a line provided perpendicular to a plane of ferrule endface 130. Shaped reflective surface 165 may be provided at an angle $\beta$ relative to a line provided parallel to the plane of ferrule endface 130. In some implementations, a size of angle $\beta$ is determined based on a size of angle $\alpha$ to ensure that direct light reflected from shaped reflective surface 165 is reflected to a surface of ferrule chamfer 135 and back to camera 140. For example, angle $\beta$ may range from approximately twenty-five degrees (25°) to approximately thirty-five degrees (35°).

In this way, microscope 105 utilizes a shaped reflector for coaxial illumination of non-normal surfaces. Microscope 105 may include a shaped reflector (e.g., shaped reflective surface 165 or 185) with a geometry that allows illumination from light source 145 to image ferrule chamfer 135 with bright field illumination. The light from light source 145 is reflected by the reflector in such a way that subsequent light reflection from ferrule chamfer 135 passes back through lens 155. Ferrule chamfer 135 and the reflector may be conical and axially symmetric. This, in turn, conserves computing resources, networking resources, human resources, and/or the like that would otherwise have been wasted in performing incorrect inspections of fiber optic connectors, incorrectly determining that faulty fiber optic connectors are functional, implementing faulty fiber optic connectors in networks, losing network data because of the faulty fiber optic connectors, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
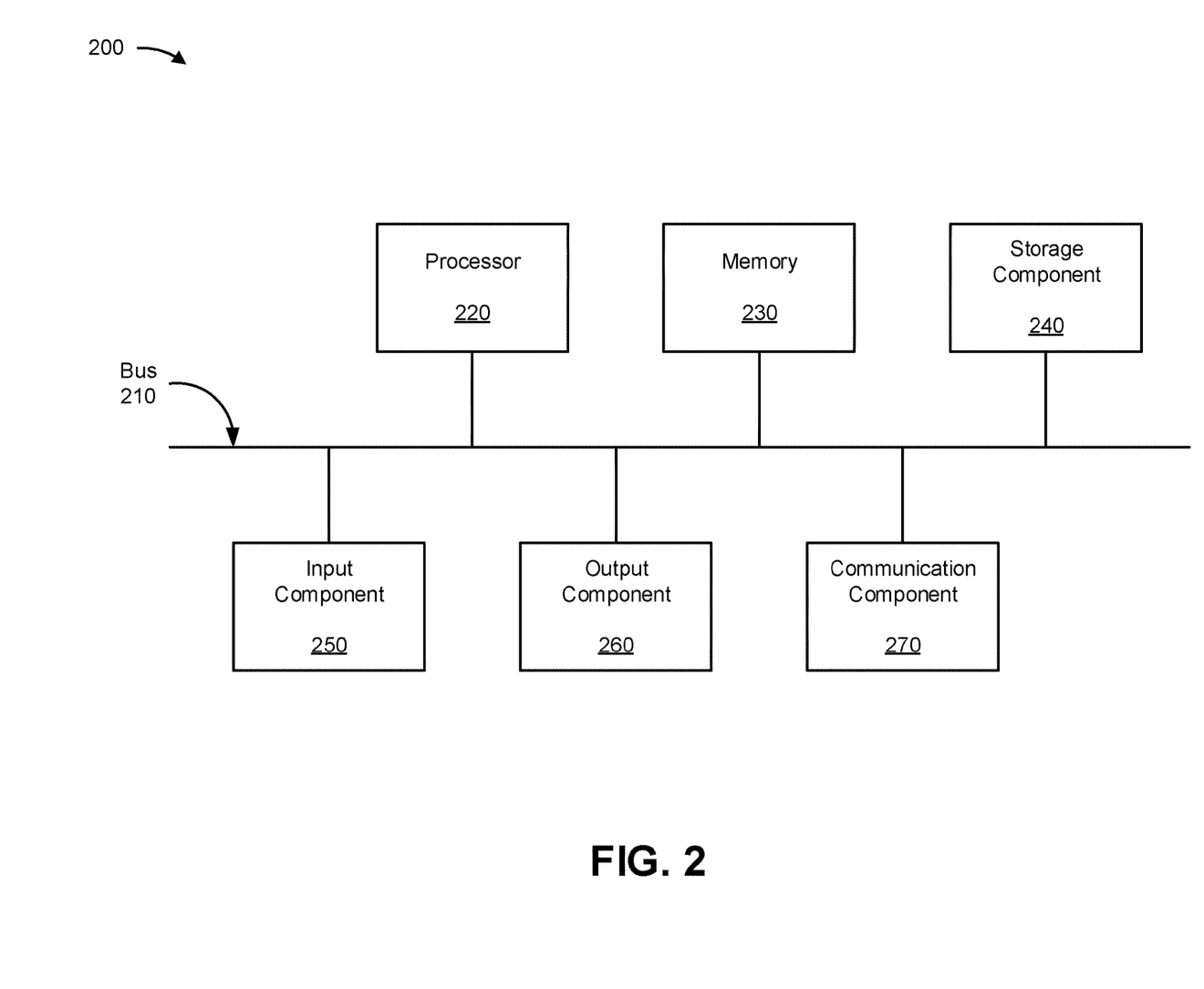
FIG. 2 is a diagram of example components of one or more devices of FIGS. 1A-1G.

FIG. 2 is a diagram of example components of a device 200, which may correspond to microscope 105. In some implementations, microscope 105 may include one or more devices 200 and/or one or more components of device 200. As shown in FIG. 2, device 200 may include a bus 210, a processor 220, a memory 230, a storage component 240, an input component 250, an output component 260, and a communication component 270.

Bus 210 includes a component that enables wired and/or wireless communication among the components of device 200. Processor 220 includes a central processing unit, a graphics processing unit, a microprocessor, a controller, a microcontroller, a digital signal processor, a field-programmable gate array, an application-specific integrated circuit, and/or another type of processing component. Processor 220 is implemented in hardware, firmware, or a combination of hardware and software. In some implementations, processor 220 includes one or more processors capable of being programmed to perform a function. Memory 230 includes a random-access memory, a read only memory, and/or another type of memory (e.g., a flash memory, a magnetic memory, and/or an optical memory).

Storage component 240 stores information and/or software related to the operation of device 200. For example, storage component 240 may include a hard disk drive, a magnetic disk drive, an optical disk drive, a solid-state disk drive, a compact disc, a digital versatile disc, and/or another type of non-transitory computer-readable medium. Input component 250 enables device 200 to receive input, such as user input and/or sensed inputs. For example, input component 250 may include a touch screen, a keyboard, a keypad, a mouse, a button, a microphone, a switch, a sensor, a global positioning system component, an accelerometer, a gyroscope, and/or an actuator. Output component 260 enables device 200 to provide output, such as via a display, a speaker, and/or one or more light-emitting diodes. Communication component 270 enables device 200 to communicate with other devices, such as via a wired connection and/or a wireless connection. For example, communication component 270 may include a receiver, a transmitter, a transceiver, a modem, a network interface card, and/or an antenna.

Device 200 may perform one or more processes described herein. For example, a non-transitory computer-readable medium (e.g., memory 230 and/or storage component 240) may store a set of instructions (e.g., one or more instructions, code, software code, and/or program code) for execution by processor 220. Processor 220 may execute the set of instructions to perform one or more processes described herein. In some implementations, execution of the set of instructions, by one or more processors 220, causes the one or more processors 220 and/or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. Device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
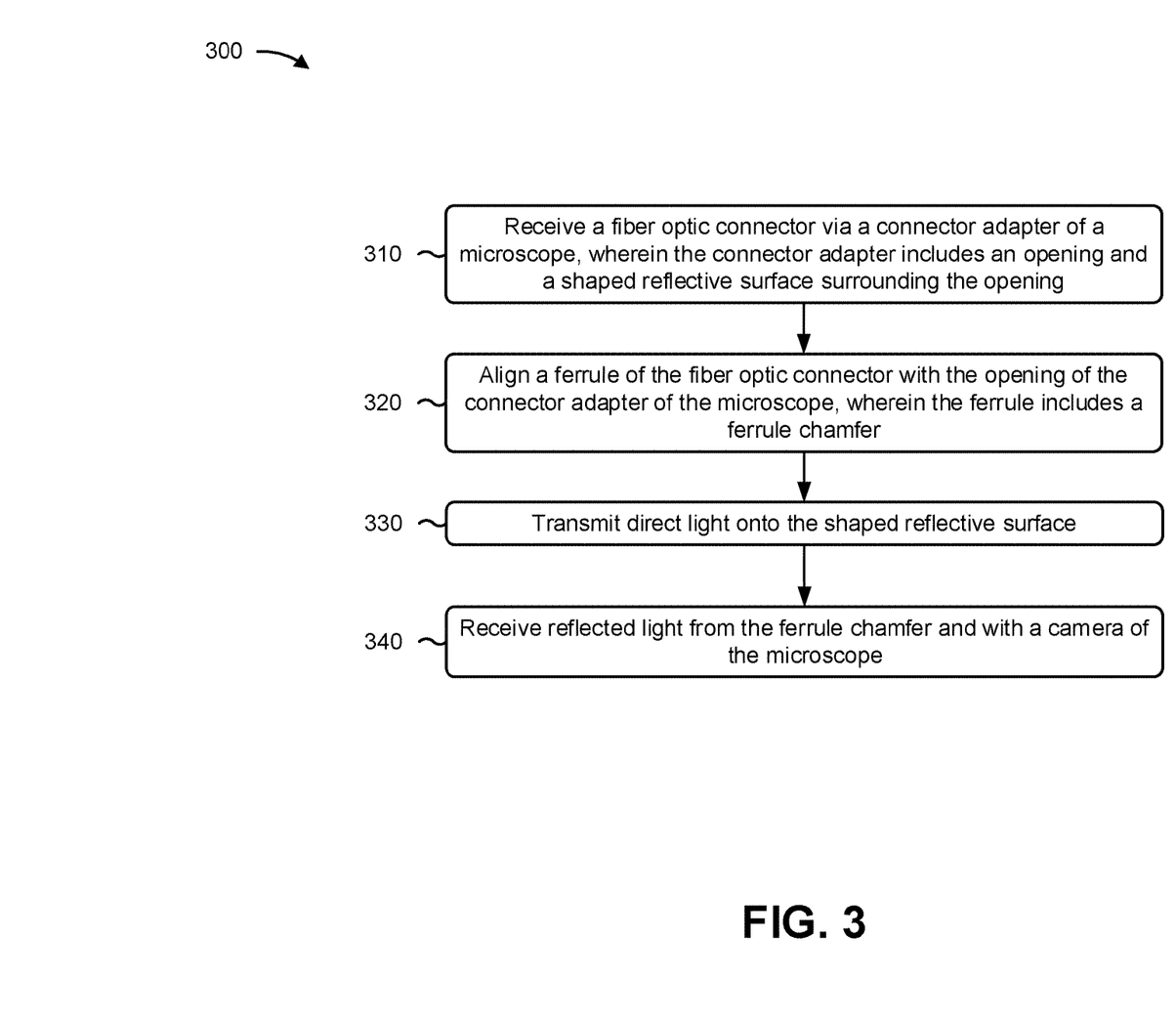
FIG. 3 is a flowchart of an example process for utilizing a shaped reflector for coaxial illumination of non-normal surfaces.

FIG. 3 is a flowchart of an example process 300 for utilizing a shaped reflector for coaxial illumination of non-normal surfaces. In some implementations, one or more process blocks of FIG. 3 may be performed by a microscope (e.g., microscope 105). In some implementations, one or more process blocks of FIG. 3 may be performed by another device or a group of devices separate from or including the microscope. Additionally, or alternatively, one or more process blocks of FIG. 3 may be performed by one or more components of device 200, such as processor 220, memory 230, storage component 240, input component 250, output component 260, and/or communication component 270.

As shown in FIG. 3, process 300 may include receiving a fiber optic connector via a connector adapter of the microscope, wherein the connector adapter includes an opening and a shaped reflective surface surrounding the opening (block 310). For example, the microscope may receive a fiber optic connector via a connector adapter of the microscope, as described above. In some implementations, the connector adapter includes an opening and a shaped reflective surface surrounding the opening.

As further shown in FIG. 3, process 300 may include aligning a ferrule of the fiber optic connector with the opening of the connector adapter of the microscope, wherein the ferrule includes a ferrule chamfer (block 320). For example, the microscope may align a ferrule of the fiber optic connector with the opening of the connector adapter of the microscope, as described above. In some implementations, the ferrule includes a ferrule chamfer.

As further shown in FIG. 3, process 300 may include transmitting direct light onto the shaped reflective surface (block 330). For example, the microscope may transmit direct light onto the shaped reflective surface, as described above.

As further shown in FIG. 3, process 300 may include receiving reflected light from the ferrule chamfer and with a camera of the microscope (block 340). For example, the microscope may receive reflected light from the ferrule chamfer and with a camera of the microscope, as described above.

Process 300 may include additional implementations, such as any single implementation or any combination of implementations described below and/or in connection with one or more other processes described elsewhere herein.

In a first implementation, the direct light reflects from the shaped reflective surface and onto the ferrule chamfer to form the reflected light.

In a second implementation, alone or in combination with the first implementation, process 300 includes determining a result based on the reflected light received by the camera and providing the result for display.

In a third implementation, alone or in combination with one or more of the first and second implementations, transmitting the direct light onto the shaped reflective surface includes one of transmitting the direct light, from a light source of the microscope and via a beam splitter of the microscope, onto the shaped reflective surface; transmitting the direct light, from the light source and via the beam splitter, onto a prism of the connector adapter; or transmitting the direct light, from an offset light source of the microscope, onto the shaped reflective surface.

In a fourth implementation, alone or in combination with one or more of the first through third implementations, a size and a shape of the shaped reflective surface depends on a size and a shape of the ferrule and on a size and a shape of the ferrule chamfer.

In a fifth implementation, alone or in combination with one or more of the first through fourth implementations, the microscope includes a beam splitter to receive the direct light from the light source, transmit the direct light onto the shaped reflective surface, receive the reflected light from the ferrule chamfer, and transmit the reflected light to the camera.

In a sixth implementation, alone or in combination with one or more of the first through fifth implementations, the connector adapter includes a prism, and the light source is to transmit the direct light onto a reflective surface of the prism.

In a seventh implementation, alone or in combination with one or more of the first through sixth implementations, the light source is an offset light source to transmit the direct light at an angle onto the shaped reflective surface.

In an eighth implementation, alone or in combination with one or more of the first through seventh implementations, the reflected light from the ferrule chamfer is imaged at the camera with bright field illumination.

In a ninth implementation, alone or in combination with one or more of the first through eighth implementations, the microscope includes a lens, provided between the light source and the connector adapter, to receive the direct light from the light source, transmit the direct light onto the shaped reflective surface, receive the reflected light from the ferrule chamfer, and form an image of the ferrule chamfer on the camera based on the reflected light.

In a tenth implementation, alone or in combination with one or more of the first through ninth implementations, the shaped reflective surface includes one or more of a polished metal, a coated glass, or a metallized plastic.

In an eleventh implementation, alone or in combination with one or more of the first through tenth implementations, the ferrule includes an axial bore through which an optical fiber is provided.

In a twelfth implementation, alone or in combination with one or more of the first through eleventh implementations, the connector adapter includes a body portion configured to connect with the microscope, and the body portion includes that opening that is configured to receive and retain the ferrule of the fiber optic connector.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a microscope, a fiber optic connector via a connector adapter of the microscope,
  wherein the connector adapter includes an opening and a shaped reflective surface surrounding the opening;
 aligning, by the microscope, a ferrule of the fiber optic connector with the opening of the connector adapter of the microscope,
  wherein the ferrule includes a ferrule chamfer or a ferrule radius,
   wherein the ferrule chamfer or the ferrule radius is provided at an edge formed between a ferrule endface and an outer surface of a body portion of the ferrule;
 transmitting, by the microscope, direct light onto the shaped reflective surface,
  wherein the direct light is a first light beam,
  wherein the direct light is to reflect off the shaped reflective surface onto the ferrule chamfer or the ferrule radius to form reflected light from the ferrule chamfer or the ferrule radius, and
  wherein a second light beam, different from the first light beam, is to reflect off the ferrule endface; and
 receiving, by the microscope, the reflected light from the ferrule chamfer or the ferrule radius and with a camera of the microscope.

2. The method of claim 1, wherein the direct light reflects from the shaped reflective surface and onto the ferrule chamfer or the ferrule radius to form the reflected light.

3. The method of claim 1, further comprising:
 determining, by the microscope, a result based on the reflected light received by the camera; and
 providing, by the microscope, the result for display.

4. The method of claim 1, wherein transmitting the direct light onto the shaped reflective surface comprises one of:
 transmitting the direct light, from a light source of the microscope and via a beam splitter of the microscope, onto the shaped reflective surface;
 transmitting the direct light, from the light source and via the beam splitter, onto a prism of the connector adapter; or
 transmitting the direct light, from an offset light source of the microscope, onto the shaped reflective surface.

5. The method of claim 1, wherein a size and a shape of the shaped reflective surface depends on a size and a shape of the ferrule and on a size and a shape of the ferrule chamfer or the ferrule radius.

6. A microscope, comprising:
 a connector adapter that includes an opening and a shaped reflective surface surrounding the opening,
  wherein the connector adapter is configured to align a ferrule of a fiber optic connector with the opening of the connector adapter,
  wherein the ferrule includes a ferrule chamfer,
   wherein the ferrule chamfer is provided at an edge formed between a ferrule endface and an outer surface of a body portion of the ferrule;
 a light source to transmit direct light to the shaped reflective surface and onto the ferrule chamfer,
  wherein the direct light includes a first light beam,
  wherein the direct light is to reflect off the shaped reflective surface onto the ferrule chamfer to form reflected light from the ferrule chamfer, and
  wherein a second light beam, different from the first light beam, is to reflect off the ferrule endface; and
 a camera to receive the reflected light from the ferrule chamfer.

7. The microscope of claim 6, further comprising:
a beam splitter to:
receive the direct light from the light source,
transmit the direct light onto the shaped reflective surface,
receive the reflected light from the ferrule chamfer, and
transmit the reflected light to the camera.

8. The microscope of claim 6, wherein the connector adapter includes a prism, and wherein the light source is to transmit the direct light onto the prism.

9. The microscope of claim 6, wherein the light source is an offset light source to transmit the direct light at an angle onto the shaped reflective surface.

10. The microscope of claim 6, further comprising:
one or more processors configured to:
determine a result based on the reflected light received by the camera; and
provide the result for display.

11. The microscope of claim 6, wherein the reflected light from the ferrule chamfer is imaged at the camera with bright field illumination.

12. The microscope of claim 6, further comprising:
a lens, provided between the light source and the connector adapter, to:
receive the direct light from the light source,
transmit the direct light onto the shaped reflective surface,
receive the reflected light from the ferrule chamfer, and
form an image of the ferrule chamfer on the camera based on the reflected light.

13. The microscope of claim 6, wherein the shaped reflective surface includes one or more of:
a polished metal,
a coated glass, or
a metallized plastic.

14. The microscope of claim 6, wherein the direct light reflects from the shaped reflective surface and onto the ferrule chamfer to form the reflected light.

15. The microscope of claim 6, wherein a size and a shape of the shaped reflective surface depends on a size and a shape of the ferrule and on a size and a shape of the ferrule chamfer.

16. The microscope of claim 6, wherein the ferrule includes an axial bore through which an optical fiber is provided.

17. A connector adapter, comprising:
a body portion configured to connect with an optical microscope,
wherein the body portion includes an opening that is configured to receive and retain a ferrule of a fiber optic connector,
wherein the ferrule includes a ferrule chamfer,
wherein the ferrule chamfer is provided at an edge formed between a ferrule endface and an outer surface of a body portion of the ferrule; and
a shaped reflective surface surrounding the opening and being configured to:
receive direct light from a light source of the optical microscope,
wherein the direct light includes a first light beam,
wherein the direct light is to reflect off the shaped reflective surface onto the ferrule chamfer to form reflected light from the ferrule chamfer, and
wherein a second light beam, different from the first light beam, is to reflect off the ferrule endface, and
reflect the direct light, as reflected light, to a camera of the optical microscope and via the ferrule chamfer.

18. The connector adapter of claim 17, wherein the direct light reflects from the shaped reflective surface and onto the ferrule chamfer to form the reflected light.

19. The connector adapter of claim 17, wherein a size and a shape of the shaped reflective surface depends on a size and a shape of the ferrule and on a size and a shape of the ferrule chamfer.

20. The connector adapter of claim 17, wherein the shaped reflective surface includes one or more of:
a polished metal,
a coated glass, or
a metallized plastic.

* * * * *